United States Patent [19]

Frey et al.

[11] Patent Number: 6,080,800
[45] Date of Patent: Jun. 27, 2000

[54] AQUEOUS WAX DISPERSIONS AS CELL OPENERS IN MAKING POLYURETHANE FLEXIBLE FOAMS

[75] Inventors: John Herbert Frey, Allentown; Allen Robert Arnold, Jr., Catasauqua; Timothy Charles Boyer, New Tripoli; Kevin Rodney Lassila, Macungie, all of Pa.

[73] Assignee: Air Products and Chemicals, Inc., Allentown, Pa.

[21] Appl. No.: 09/280,341

[22] Filed: Mar. 29, 1999

[51] Int. Cl.$^7$ .................. C08J 9/08; C08J 9/14; C08K 5/01; C08K 5/103; C08K 5/5415

[52] U.S. Cl. .......... 521/132; 521/110; 521/112; 521/130; 521/131; 521/137; 521/170; 521/172; 521/174; 521/122

[58] Field of Search ................ 521/110, 112, 521/130, 131, 132, 137, 170, 172, 174, 122

[56] References Cited

U.S. PATENT DOCUMENTS

| | | | |
|---|---|---|---|
| 3,454,504 | 7/1969 | Murai et al. | 521/110 |
| 4,309,509 | 1/1982 | Wood | 521/132 |
| 4,431,455 | 2/1984 | Brown et al. | 106/245 |
| 4,751,253 | 6/1988 | Tylenda | 521/114 |
| 4,791,146 | 12/1988 | Tylenda | 521/114 |
| 4,929,646 | 5/1990 | Nichols et al. | 521/137 |
| 4,936,917 | 6/1990 | Harakal et al. | 106/38.22 |
| 5,614,566 | 3/1997 | Burkhart et al. | 521/132 |

FOREIGN PATENT DOCUMENTS

WO96/37533  11/1996  WIPO.

OTHER PUBLICATIONS

Ron Herrington and Kathy Hock; "Flexible Polyurethane Foams"; Dow Plastics p. 2.31, 1991.

*Primary Examiner*—Rabon Sergent
*Attorney, Agent, or Firm*—Michael Leach

[57] ABSTRACT

A method for preparing a flexible or semi-flexible polyurethane foam by reacting an organic polyisocyanate with a polyol in the presence of urethane catalyst, water as a blowing agent, optionally a silicone surfactant, and a cell opening additive characterized in that the cell opening additive comprises an aqueous dispersion of particles comprising a wax substance and optionally an emulsifier, at least 35% of the particles having a size of 0.2 to 5 microns and a melting point which ranges from 0 to 55° C. below the maximum foam exotherm temperature.

20 Claims, No Drawings

AQUEOUS WAX DISPERSIONS AS CELL OPENERS IN MAKING POLYURETHANE FLEXIBLE FOAMS

FIELD OF THE INVENTION

The invention relates to making polyurethane flexible foams using dimensional stabilizing/cell opening additives.

BACKGROUND OF THE INVENTION

Flexible molded polyurethane foam requires mechanical crushing to open foam cells and prevent shrinkage and to improve dimensional stability of the foam pad. Current mechanical methods for cell opening consist mainly of crushing, vacuum rupture or time pressure release.

Upon demold, mechanically crushing and breaking the polyurethane foam cells enables the polyurethane foam to be more dimensionally stable. Another method of breaking the cells is vacuum crushing which involves drawing a vacuum on the finished polyurethane foam causing cell rupture. The overall effect of these methods is reduced foam shrinkage.

Other mechanical attempts have been made to achieve dimensionally stable foam, such as decreasing cycle production times. For example, demolding the polyurethane foam in three minutes as compared to four minutes will dramatically improve the dimensional stability. Another method for producing dimensionally stable foam is time pressure release (TPR). TPR comprises opening the mold during the curing process to release the internal pressure and then reclosing for the duration of the cure time. The sudden release of the internally generated pressure bursts the cell windows, thereby obtaining an open cell foam.

Mechanical methods usually result in incomplete or inconsistent cell opening and require a flexible molded foam producer to invest in additional machinery. A chemical method for cell opening would be preferred.

The current chemical methods all have drawbacks such as requiring high levels often as high as 1–5 weight parts per hundred parts polyol (pphpp) or adversely affecting the foam physical properties.

U.S. Pat. No. 3,454,504 discloses a cell opening agent for producing polyurethane foam which is a liquid polypropylene or a polybutene.

U.S. Pat. No. 4,431,455 discloses an organic polyisocyanate composition containing a liquid organic polyisocyanate and a mixture of a wax and a liquid ester. The composition, which is preferably applied in the form of an aqueous emulsion, is used for the manufacture of sheets or molded bodies, such as chipboard, fiberboard and plywood, by the hot-pressing of a lignocellulosic material and promotes release of the material from the press.

U.S. Pat. No. 4,751,253 discloses a cell opening, dimensionally stabilizing agent for making flexible foam which comprises an ester reaction product of a long chain acid with polyethylene or polypropylene glycols and/or contains free acid to provide for a desired acid value.

U.S. Pat. No. 4,929,646 discloses flexible polyurethane foams prepared using certain high molecular weight, high functionality poly(oxyethylene) compounds as cell openers and softeners. In Example 1 Cell Opener A, a nominally 6.9 functional random copolymer of 75% ethylene oxide and 25% propylene oxide having an approximate molecular weight of 35,000, was added to the polyurethane formulation as a 70/30 mixture with water.

U.S. Pat. No. 5,614,566 discloses rigid foams which are opened celled prepared by reacting the components in the presence of liquid, higher molecular weight, unsaturated hydrocarbons, which are free of groups capable of reacting with isocyanates, such as polybutadiene and polyoctenylene.

WO 96/37533 discloses preparing rigid polyurethane foams using an emulsified polyol mixture comprising (a) a polyol formulation comprising a polyol having an OH value of from 150 to 500, (b) a blowing agent, (c) a cell opening agent which is a divalent metal salt of a long chain fatty acid having a softening point from about 100–180° C., and (d) an acid, the mixture having droplets of the cell opening agent having an average mean diameter of less than about 50µ stably suspended in the polyol mixture.

U.S. Pat. No. 4,936,917 discloses a method for making a polyurethane foam using a water-based mold release composition comprising an aqueous dispersion of at least one release effective substance and a poly(siloxane-glycol) surfactant.

In a technical sales book distributed by Dow Plastics to customers (1991 ed by Ron Herrington and Kathy Hock, page 2.31), it is stated that "Known additives for inducing cell opening include silicone based antifoamers, waxes, finely divided solids and certain polyether polyols made using high concentrations of ethylene oxide." No further discussion is given in this publication regarding the types of polyurethane applications these are useful for or types of waxes that are necessary to achieve cell opening. In particular, a table is provided (page 3.19) of known cell opening additives and there is no listing of a wax-like compound. Also, this reference does not disclose a method of introducing the wax into the foam composition.

SUMMARY OF THE INVENTION

The invention provides a method for preparing flexible or semi-flexible polyurethane foams using certain stabilizing/ cell opening water dispersed additives. The method comprises reacting an organic polyisocyanate and a polyol in the presence of a catalyst composition, a blowing agent, optionally a silicone surfactant cell stabilizer, and as a dimensionally stabilizing, cell opening agent an aqueous dispersion of particles comprising a wax substance and optionally an emulsifying agent for the wax substance, at least 35% of the dispersed wax substance, or wax substance/emulsifier, particles having a size of 0.2 to 5 microns ($\mu$m).

The use of such aqueous dispersions of wax substances in making flexible polyurethane foam provides the following advantages:

the polyurethane foams (flexible and semi-flexible molded and flexible slabstock) manifest reduced shrinkage which provides for improved dimensional stability while maintaining a fine cell structure especially at the foam surface a reduction in the force necessary to crush freshly demolded foam without adversely affecting the physical properties of the foam relatively low levels of the dispersion additive, e.g., only 0.0001–2 parts by weight solids (wax substance and emulsifiers) per hundred parts of polyol (pphpp) are necessary to create cell opening the aqueous cell opening compositions are efficient enough to allow the use of stronger stabilizing surfactants such as silicone polyether copolymers which have lower emission properties than weaker stabilizing surfactants such as dimethylsilicone fluids which are traditionally used in MDI flexible molded foam For purposes of this invention and as is understood by many in the art, flexible and semi-flexible foams can include microcellular foams such as those used in shoe soles and steering wheels as well as the flexible molded foams used in furniture, bedding and automotive seating including MDI flexible molded foam, TDI/MDI flexible molded foam, TDI flexible molded foam, integral skin foam, instrument panel foam and flexible slabstock foam.

DETAILED DESCRIPTION OF THE INVENTION

The dimensional stabilizer/cell opener additives used in the preparation of the flexible and semi-flexible foams are aqueous dispersions of wax substances optionally containing an emulsifying agent for the wax substance.

Good cell opening properties are obtained by using wax substances, such as microcrystalline or paraffin waxes, with melting points within a 55° C. temperature range below the maximum polyurethane foam exotherm temperature. That is to say that the maximum exotherm temperature for a particular foam formulation is up to about 55° C. above the melting point of the wax, or wax/emulsifier, particles. The melting point limitation will vary as a function of the foam formulation type, i.e., MDI, TDI or MDI/TDI foams, since the various foam formulations will have different exotherm temperatures. (The general terms "wax" and "wax substance" are used interchangeably. It should also be understood that "wax particle" also means, when an emulsifying agent is used, the wax/emulsifier particle.)

For polyurethane foam compositions in which the organic polyisocyanate is MDI, the melting point of the dispersed particles should be 0° to 30° C. below the maximum foam exotherm temperature, preferably 2° to 10° C. below. For TDI based foam compositions the melting point of the dispersed particles should be 0° to 50° C. below the maximum foam exotherm temperature, preferably 2° to 45° C. below. For a foam composition comprising a blend of MDI and TDI in about a 40–60/60–40 weight ratio of MDI/TDI, the melting point of the dispersed particles should be 0° to 40° C. below the maximum foam exotherm temperature, preferably 2° to 30° C. below. For MDI/TDI blends comprising one of the isocyanates in amounts >60 parts by weight (pbw), the greater the pbw of such isocyanate in the blend the more the defined melting point range for the dispersed particle approaches that stated above for that sole isocyanate.

These ranges should be considered approximate since polyurethane foam components may affect the actual wax particle melting temperature and different foam formulations will vary in maximum exotherm temperature.

In addition, the particle size of the wax or wax/emulsifier dispersed in the aqueous medium should be 0.2 to 5 microns, preferably, 1.5 to 3 microns. At least 35% of the dispersed wax or wax/emulsifier particles, preferably 70%, and most preferably 80% should be within the stated size range of 0.2 to 5 microns. It is also desirable that at least 25% of the particles be 1.5 to 3 microns.

The present cell openers provide a much better surface than traditional cell opening agents and would be especially useful for integral skin formulations where a good skin is desired. It is speculated that cell opening occurs in the interior of the foam because the wax particles melt there due to the exotherm of the reacting foam; some opening may be accompanied by a coarse cell structure. It is also speculated that a good foam surface results because the wax particles remain solid in approximately a 1 cm zone on the surface of the foam due to the relatively lower temperature of the mold surface compared to the internal foam exotherm temperature and cell opening does not occur in this zone. Accordingly, it is also advantageous that the wax particles have a melting temperature above the mold temperature, although this is not mandatory.

The aqueous wax dispersions contain wax substances, preferably ionic and/or nonionic emulsifiers, and other additives with the total water content of the composition being generally about 50 to 95 wt %, preferably 55 to 90 wt %. Suitable cell opening and stabilization is obtained when the waxes are present in the foam formulations in concentrations ranging from 0.0001 to 2 wt parts per hundred parts polyol (pphpp), preferably about 0.001 to 0.3 pphpp. Of course, it is required that the wax substances and any emulsifying agents comprising the dispersed particles in the aqueous dispersion have a melting point that is no more than 55° C., preferably 5 to 45° C., lower than the maximum foam exotherm temperature and also have the stated particle size.

Suitable wax substances are any of those waxes, microwaxes, thickened petroleum fractions, and polysiloxane release agents well known in the art. The wax substances are typically microcrystalline or paraffin waxes with melting points between 85° and 100° C. Also effective are synthetic waxes such as glyceryl fatty acid esters and higher molecular weight polyethylene glycols. These high molecular weight esters of fatty acids typically contain 5–30 carbon atoms and can be used either in their unsaturated or hydrogenated forms. Polyethylene glycols have molecular weights from 4,000 to 8,000.

Waxes which may also be used in the compositions include vegetable waxes, for example, carnauba wax; modified vegetable oils, for example, hydrogenated castor oil; microcrystalline waxes, for example, Bareco and Amsco waxes; mineral waxes, for example, Montan wax (a mineral obtained from lignite); and animal waxes, for example, bees wax or shellac. Synthetic or modified animal waxes such as pentaerythritol tetrastearate, or commercially available synthetic waxes may also be used. Mixtures of waxes may also be used.

Suitable emulsifying agents are any of those known in the art for preparing aqueous emulsions of wax substances, particularly those with an HLB value of 8–15 and especially polyalkoxylated nonionic surfactants. In order to obtain efficient emulsification of the wax substances in water, ionic emulsifiers are used in combination with the nonionic emulsifiers.

The preferred emulsifying agents are the fatty alcohol ethoxylates such as the ethoxylates of lauryl alcohol having 3–4 ethoxy units and cetyl alcohol having about 10 ethoxy units. These fatty alcohol ethoxylates typically would have an HLB value between 10 and 13. Other useful emulsifying agents are fatty amines such as tallow amines comprising combinations of octadecyl and hexadecyl amine. In addition to fatty amines, fatty acids such as octadecyl acid can also be used.

Typically, no single emulsifying agent is sufficient to adequately emulsify the wax substances in the aqueous composition. Rather it is a combination of emulsifying agents that provides for the most consistent dispersion. Fatty alcohol ethoxylates are typically used at between 0.5 and 4.5 wt %, based on the aqueous wax composition. Fatty amines are used typically between 0.5 and 3 wt %. The fatty acids serve as effective emulsifying agents and may be used in concentrations of about 0.25 to 0.75 wt %.

The aqueous wax dispersions of the invention may be prepared by mixing the components together with sufficient shear energy and at such a temperature that the wax is in a liquid state within the particle size range described. Thus, the water, wax and emulsifying agent, usually at different temperatures, may be vigorously stirred together at a temperature in the range of 90° to 150° C., preferably 100° to 140° C., the dispersion then being quickly cooled below 50° C. by quenching with cold water.

The preferred use level of these aqueous dispersion cell openers is 0.0001–2 parts by wt wax substance per hundred parts polyol (pphpp), more preferred is 0.001–0.3 pphpp, and most preferred is 0.005–0.05 pphpp. The aqueous wax dispersion is added to one of the components of the formulation such as the surfactant, water, amine catalyst, crosslinker or polyol, but preferably to the B-side comprising the polyol composition, surfactant, blowing agent (preferably water), amine catalyst, and crosslinker.

The stabilizer/cell openers according to the invention are employed in the manufacture of polyether and polyester flexible and semi-flexible polyurethane foams in the manner known to the art. In producing the polyurethane foams using these cell openers, one or more polyether or polyester polyols are employed for reaction with a polyisocyanate, especially a diisocyanate, to provide the urethane linkage. Such polyols typically have an average of 2.0 to 3.5 hydroxyl groups per molecule, hydroxyl numbers (OH#) from 20 to 60, and weight average molecular weights from 2000 to 7000 daltons. The density of a flexible polyurethane foam can be 0.6–37.5 lb/ft$^3$ (10–600 kg/m$^3$) and a semi-flexible foam 1–3.75 lb/ft$^3$ (16–60 kg/m$^3$).

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanate well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of MDI along with other isomeric and analogous higher polyisocyanates. Also suitable are "prepolymers" of these polyisocyanates comprising a partially prereacted mixture of a polyisocyanate and a polyether or polyester polyol.

Suitable urethane catalysts useful in making polyurethane flexible foams are all those well known to the worker skilled in the art and include tertiary amines such as triethylenediamine, N-methylimidazole, 1,2-dimethylimidazole, N-methyl morpholine, N-ethyl morpholine, triethylamine, tributylamine, triethanolamine, dimethylethanolamine and bis(dimethylaminoethyl) ether, and organotins such as stannous octoate, stannous acetate, stannous oleate, stannous laurate, dibutyltin dilaurate, and other such tin salts.

Other typical agents found in the flexible polyurethane foam formulations include chain extenders such as ethylene glycol and butanediol; crosslinkers such as diethanolamine, diisopropanolamine, triethanolamine and tripropanolamine; blowing agents such as water, liquid carbon dioxide, CFCs, HCFCs, HFCs, pentane, acetone and the like, especially water or water and HCFC; and cell stabilizers such as silicones.

The flexible polyurethane foams that can be prepared using the present invention include slabstock foams having a density of 12–100 kg/m$^3$, such as polyether-based: conventional (12–60 kg/m$^3$), high resilience (18–80 kg/m$^3$), filled (40–100 kg/m$^3$), semi-rigid (22–35 kg/m$^3$); and polyester-based: technical grades (20–50 kg/m$^3$), laminating grades (20–35 kg/m$^3$) and semi-rigid (22–35 kg/m$^3$) as well as molded foams having a density of 22–300 kg/m$^3$, such as polyether-based: conventional hot-cure (22–50 kg/m$^3$), high resilience and cold-cure (28–55 kg/m$^3$), semi-rigid (40–150 kg/m$^3$), and polyester-based (50–150 kg/m$^3$), "repol" or rebonded (60–300 kg/m$^3$). Also possible are microcellular molded foams having a core density of 400–600 kg/m$^3$, a skin density of 600–800 kg/m$^3$ and an overall density of 500–700 kg/m$^3$.

A general polyurethane flexible molded foam formulation having a 1–5 lb/ft$^3$ (16–80 kg/m$^3$) density (e.g., automotive seating) containing an aqueous wax substance dispersion as the cell opener would comprise the following components in parts by weight (pbw):

| Flexible Foam Formulation | pbw* |
|---|---|
| Polyol | 20–100 |
| Polymer Polyol | 80–0 |
| Silicone Surfactant | 0.5–2.5 |
| Cell Opener | 0.001–0.3 |
| Water | 1–6 |
| Auxiliary Blowing Agent | 0–4.5 |
| Crosslinker | 0.5–2 |

-continued

| Flexible Foam Formulation | pbw* |
|---|---|
| Catalyst Composition | 0.1–5 |
| Isocyanate Index | 70–115 |

*active material

In the present invention the preferred blowing agent for making flexible molded foams is water at 1 to 6 parts per hundred polyol (pphp), especially 3 to 6 pphp, optionally with other blowing agents.

Other additives may of course be employed to impart specific properties to the flexible foams. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation.

In the following examples the following materials were used:
CP-7 synthetic copolymer wax (Petrolite Corporation)
Brij 56 polyoxyethylene cetyl ether (ICI Americas, Inc.)
Armeen 18D octadecylamine (Akzo)
Vybar 253 hydrocarbon copolymer wax (Petrolite)
Vybar 260 hydrocarbon copolymer wax (Petrolite)
Epolene E15 wax (Eastman)
CP6001 polyol (Dow Chemical; OH#=28 )
CP1421 cell opening polyol (Dow Chemical)
DEOA (diethanolamine)
TEOA (triethanolamine)
DABCO™ DEOA-LF (85% DEOA, 15% water; Air Products and Chemicals, Inc.)
DABCO® DC2585 silicone surfactant (Air Products and Chemicals, Inc.)
DABCO® BL11 amine catalyst (Air Products and Chemicals, Inc.)
DABCO 33LV® amine catalyst (Air Products and Chemicals, Inc.,
H2050 amine catalyst (Air Products and Chemicals, Inc.)
Desmodur 3230 MDI (Bayer; equivalent wt=130.08)
PRC-798 release agent (Chem-Trend, Inc.)
LX1000—proprietary water/wax dispersion (Petrolite; made with Polywax 1000 wax, melting temp=113° C.)
LX1130—proprietary water/wax dispersion (Petrolite; made with EP-700 wax, melting temp=96° C.)
LX1061—proprietary water/wax dispersion (Petrolite; made with Polywax 655 wax, melting temp=99° C.)
Epolene E15 #3—water/wax dispersion (Eastman)
Epolene E20 #6—water/wax dispersion (Eastman)
Duramul 766—water/wax dispersior (Astor Chemical Co.)
Voranol 232-027 polyol (Dow Chemical; OH#=26)
Mondur MRS-5 MDI (Bayer; eq wt=133)
Arcol E 648 polyether polyol (Arco Chemical; OH#=35)
Arcol E519 SAN copolymer polyol (Arco Chemical; OH#= 24.4)
DABCO DC5169 silicone surfactant (Air Products and Chemicals, Inc.)
DABCO DC5164 silicone surfactant (Air Products and Chemicals, Inc.)
DABCO DC5043 silicone surfactant (Air Products and Chemicals, Inc.)
L1505A silicone surfactant (Air Products and Chemicals, Inc.)
DABCO BL 17 amine catalyst (Air Products and Chemicals, Inc.)
TDI-80 (Bayer Corp.)
MDI Rubinate M MDI (ICI Americas, Inc.; 31.5% NCO; Funct. 2.7)

EXAMPLE 1

This example shows the preparation of aqueous wax dispersions (water/wax dispersions).

For each water/wax dispersion (WWD) in Table 1, 150 g wax, 22.5 g Brij 56 emulsifier and 15 g Armeen 18D emulsifier were combined and melted at 110° C. In a separate container, 525 g water were heated to 93° C. or higher. The melted wax components were added to the hot water with extreme agitation. 787.5 grams of 20° C. water was added to quench the wax particles. The water/wax dispersions WWD1–WWD3 were used "as made" in the following examples.

TABLE 1

| | M Pt$^a$ (°C.)$^b$ | M Pt$^a$ (°C.)$^c$ | WWD1 | WWD2 | WWD3 |
|---|---|---|---|---|---|
| CP7 | 96 | 89 | 10% | | |
| Vybar 253 | 68 | 61.7 | | 10% | |
| Vybar 260 | 53 | — | | | 10% |
| Brij 56 | 32 | 28 | 1.5% | 1.5% | 1.5% |
| Armeen 18D | 53 | 51 | 1.0% | 1.0% | 1.0% |
| total water | | | 87.5% | 87.5% | 87.5% |
| Dispersion particle m pt (°C.$^c$) | | | 85° C. | 60.7° C. | 42.8° C. |

$^a$Melting point on pure component
$^b$Published
$^c$Max on DCS

Aqueous wax dispersion WWD4 of Table 2 was made using a slightly different procedure due to the high melting point of the wax. For 1500 g of dispersion, 150 g Epolene E15 wax, 22.5 g Brij 56 emulsifier and 15 g Armeen 18D emulsifier were combined and melted at 139° C. In a separate container, 525 g water were heated to 100° C. When the water reached 93° C., the mixer blade was immersed in the water to heat it. The wax should not be added to the water unless the water is at 100° C. After the wax was added to the hot water and mixed with extreme agitation, 787.5 g cold water was added and mixed to quench the wax particles.

TABLE 2

| | M Pt$^a$ (°C.)$^b$ | M Pt$^a$ (°C.)$^c$ | WWD4 |
|---|---|---|---|
| Epolene E15 | 100 | 94 | 10% |
| Brij 56 | 32 | 28 | 1.5% |
| Armeen 18D | 53 | 51 | 1.0% |
| total water | | | 87.5% |
| Dispersion particle m pt (°C.$^c$) | | | 91° C. |

$^a$Melting point on pure component
$^b$Published
$^c$Max on DCS

Table 3 shows the melting point of the dispersed wax particle in commercially available water/wax dispersions (WWD) which were used in the Example 2:

TABLE 3

| Commercial WWD | M Pt$^a$ (°C.)$^b$ | M Pt$^c$ (°C.)$^d$ |
|---|---|---|
| LX1000 | 113 | 111 |
| LX1061 | 99 | 92 |
| LX1130 | 96 | 90 |
| Epolene E20 #6 | 111 | 105 |
| Epolene E15 #3 | 100 | 86 |
| Duramul 766 | 122 | 126 |

$^a$Melting point on pure component
$^b$Published
$^c$Melting point on dispersion particle
$^d$Max on DCS

EXAMPLE 2

MDI flexible molded polyurethane foams were prepared using the formulation of Table 4.

TABLE 4

| Component | Parts by Weight |
|---|---|
| Voranol CP 6001 | 100.0 |
| DC2585 | 0.40 |
| DEOA-LF | 0.71 |
| Water (added) | 2.99 |
| DABCO 33 LV ® | 0.25 |
| DABCO ® BL-11 | 0.25 |
| Stabilizer/Cell Opener | Variable |
| Desmodur 3230, MDI Index = 100 | |

Molded polyurethane foam samples were prepared using the following procedure. The amine preblend was prepared by mixing the water, DEOA-LF and amine catalysts, on the same day the foam was made. The polyol was measured out into a ½ gallon (1.89 L) cup and the DC2585 silicone surfactant and the WWD stabilizer/cell opener was added. The charge factor was 3.5 which produced an overpack in the mold of 6%. Using a Servodyne® dispersator with a 3 in (7.6 cm) disc mixing blade and controller set at 6000 rpm loaded, the cup of liquid was mixed 25 seconds. The amine preblend was added and mixed for 20 seconds. The MDI was added and the liquid was mixed for 6 seconds. The mixture was poured into a 12×12×4 inch (30.5×30.5×10.2 cm), 126° F. (52° C.) mold, which was sprayed with a solvent based release agent (PRC-798), the cup was poured for 5 seconds, and the mold was immediately closed. Demold time was 355 seconds after mixing. Force to crush measurement was taken 410 seconds after mixing. For each foam, the following data was obtained and is presented in Table 5: force to crush (FTC), bulk stability, surface quality and percent shrinkage. The premix was incubated to control the temperature.

TABLE 5

| Additive | Use Level (pphpp*) | Use Level Solids (pphpp**) | Initial FTC | Bulk Stability | Surface Quality | % Shrinkage |
|---|---|---|---|---|---|---|
| None | — | — | 232 | 4.1 | 5 | 15 |
| None | — | — | 248 | 4.2 | 4.5 | 19 |
| CP1421 | 0.02 | — | 258 | 4.2 | 5 | 21 |
| CP1421 | 0.5 | — | 225 | 4.1 | 5 | 11 |
| CP1421 | 1.0 | — | 106 | 4.1 | 5 | 3 |
| CP1421 | 1.0 | — | 95 | 4.1 | 5 | 4 |
| CP1421 | 1.0 | — | 103 | 4.1 | 4.5 | 4 |
| WWD1 | 0.02 | 0.0024 | 204 | 4.1 | 5 | 12 |
| WWD1 | 0.1 | 0.012 | 83 | 4.0 | 4.5 | 4 |
| WWD2 | 0.02 | 0.0024 | 198 | 3.3 | 5 | 6 |
| WWD2 | 0.1 | 0.012 | 210 | 1.0 | 1.5 | 5 |
| WWD3 | 0.02 | 0.0024 | 224 | 4.0 | 2.5 | 13 |
| WWD3 | 0.1 | 0.012 | 219 | 1.75 | 1 | 16 |
| LX1000 | 0.02 | 0.008 | 255 | 4.2 | 4.5 | 16 |
| LX1000 | 0.1 | 0.04 | 256 | 4.1 | 4.5 | 15 |
| LX1130 | 0.02 | 0.04 | 226 | 4.1 | 4.5 | 18 |
| LX1130 | 0.1 | 0.04 | 246 | 4.1 | 5 | 14 |
| Epolene E15 #3 | 3.0 | 1.05 | 294 | 4.25 | 4.8 | — |
| Epolene E15 #3 | 0.2 | 0.07 | 313 | 4.25 | 4.5 | — |

*pphpp-parts wax dispersion per hundred parts polyol
**pphpp-parts wax/emulsifier per hundred parts polyol
BULK, STABILITY is ranked from 1 to 5 with 1 being very large cells and 5 being uniform fine cells.
SURFACE QUALITY is ranked from 1 to 5 with 1 being large surface cells and 5 being fine surface cells.

It can be seen from the data in Table 5 the water/wax dispersions made with CP7 wax (WWD1) provided a reduced force to crush and shrinkage while maintaining cell structure in the bulk and surface. Commercial cell opener CP1421 also improved foam shrinkage and force to crush, however, not to the same extent as WWD1 and also at a higher use level than WWD1. CP1421 is typically used at use levels of 1 to 2 pphpp, i.e., 1 to 2 wt parts CP1421 per hundred wt parts polyol.

Dispersion wax particles that melt too low (WWD2—60.70° C. and WWD3—42.8° C.) resulted in destabilization of the foam and a lower bulk stability rating. Wax particles that melt too high (LX1000—111° C. and LX1130—90° C.) did not provide any cell opening advantage in terms of force to crush or % shrinkage. Water/wax dispersion WWD1 had a dispersion particle melting point of 85° C.

Without being bound by any particular theory, a wax that melts too low during the polymerization process, destabilizes the foam too early before the viscosity of the foam is high enough to maintain stability. A waxes that melts too high, remains a solid particle and does not affect cell opening. Therefore, it is believed that the optimum waxes and emulsifiers used for cell opening in MDI foam formulations would provide a wax particle having a melting point in a range whose upper limit is the maximum foam exotherm temperature and the lower limit is about 30° C. below the maximum foam exotherm temperature. For example, the approximate foam exotherm maximum temperature of the MDI formulation of Table 4 is 91° C., then the range of the wax particle melting point would be about 61 to 91° C., with a preferred range of 81 to 89° C. These ranges should be considered approximate since polyurethane foam components may affect the actual wax particle melting temperature and different foam formulations will vary in maximum exotherm temperature.

EXAMPLE 3

This example shows the effect of using the individual components of aqueous wax dispersion WWD1 as cell openers in the MDI flexible molded foam formulation of Table 4. As seen in Table 6 none of the components used individually performed as well as their combination in WWD1.

TABLE 6

| Additive | Use Level (pphpp) | Initial Force to Crush |
|---|---|---|
| Brij 56 melted | 0.1 | 255 |
| CP7 pieces | 0.1 | 248 |
| CP7 melted | 0.1 | 260 |
| Armeen 18D pieces | 0.1 | 214 |
| Armeen 18D melted | 0.1 | 180 |

EXAMPLE 4

This example illustrates the effect of wax particle size on cell opening. Without being bound by any particular theory, it is believed that the wax particle size in the water/wax dispersion is important to cell opening in polyurethane foam. The cell windows are generally thought to have a thickness of about 0.2 to 0.4 microns ($\mu$m). If the particle size is too small compared to the cell window thickness, the water/wax dispersion may have no affect. If the particle size is too large compared to the cell window thickness, poor cell structure may result or the wax particle may be unable to reside in the cell window or the entire particle may not be able to completely melt during the optimum time for cell opening. The average wax particle size determined by the Horiba LA-910 Laser Diffraction System of various water/wax dispersions are shown in Table 7.

TABLE 7

| Additive | Average Wax Particle Size* ($\mu$m) | Particle Size Range** ($\mu$m) | % of Particles 0.2–5 $\mu$m | % of Particles 1.5–3 $\mu$m |
|---|---|---|---|---|
| WWD1 | 1.7 | 0.1–20 | 85 | 30 |
| WWD2 | 2.5 | 0.1–20 | 93 | 34 |
| WWD3 | 15. | 0.1–90 | 32 | 7 |
| WWD4 | 10. | 0.2–200 | 40 | 10 |
| LX1000 | 30. | 0.1–220 | 37 | 4 |
| LX1130 | 0.3 | 0.1–30 | 84 | 11 |
| LX-1061 | 0.45 | 0.1–5 | 97 | 2 |
| Epolene E-20 #6 | 0.09 | 0.02–0.17 | | |
| Epolene E-15 #3 | 0.09 | 0.02–0.15 | | |

*midpoint of major peak in particle size distribution
**major peaks

Epolene E15 #3 dispersion was compared with WWD1 because both of these materials have a similar particle melting point (86° vs 85° C., respectively), but they have very different average particle sizes (1.7 vs 0.09 microns, respectively). The WWD1 water/wax dispersion was very effective at cell opening in the MDI formulation of Table 4 as shown in Table 5, whereas, Epolene E15 #3 was ineffective at cell opening at use levels ranging from 0.2 to 3 pphpp. Epolene E15 #3 had no adverse impact on surface quality or bulk stability, but had no impact on initial force to crush. The Epolene E15 #3 particle size is probably too small to have an impact on cell opening even though the melt point of this water/wax dispersion is in an acceptable range.

EXAMPLE 5

A second MDI formulation as shown in Table 8 was used. The charge factor for this formulation was 3.4 which produced a 6% overpack part in the mold. As show in Table 9 the water wax dispersion WWD1 provided a reduced force to crush and improved shrinkage in this formulation also.

TABLE 8

| Component | Parts by Weight |
|---|---|
| Voranol 232-027 | 100.0 |
| DC2585 | 0.40 |
| DEOA-LF | 0.71 |
| Water (added) | 3.39 |
| DABCO ® 33 LV | 0.13 |
| DABCO ® BL-11 | 0.32 |
| Stabilizer/Cell Opener | Variable |
| Mondur MRS-5, MDI Index = 100 | |

TABLE 9

| Additive | Use Level (pphpp) | Initial FTC | Bulk Stability | Surface Quality | % Shrinkage |
|---|---|---|---|---|---|
| None | — | 238 | 4.1 | 5 | 14 |
| CP1421 | 2.0 | 89 | 4.0 | 4.5 | 4 |
| WWD1 | 0.1 | 52 | 4.0 | 5 | 2 |

EXAMPLE 6

This example demonstrates another aspect of the invention in which the cell opening materials are efficient enough to allow the use of stronger stabilizing surfactants such as silicone polyether copolymers which have lower emission properties than weaker stabilizing surfactants such as dimethylsilicone fluids which are traditionally used in MDI flexible molded foam. The traditional MDI stabilizing surfactant (DC2585) which comprises a dimethylsilicone fluid was replaced by a stronger stabilizing surfactant (L1505A) which comprises a silicone polyether copolymer traditionally used in TDI formulations. It can be seen in Table 10, L1505A by itself provided overstabilization in the MDI formulation of Table 4 with high values of force to crush and shrinkage. When L1505A was used together with the water/wax dispersion WWD1, a good foam resulted with low values of force to crush and shrinkage and good bulk and surface properties. Table 10 also shows that WWD1 in combination with L1505A also provided a lower force to crush than commercially available CP1421 at 2.0 pphpp in combination with L1505A in the MDI flexible molded foam formulation of Table 8.

TABLE 10

| Additive | L1505A (pphpp) | WWD1 (pphpp) | Initial FTC | Bulk Stability | Surface Quality | % Shrinkage |
|---|---|---|---|---|---|---|
| None* | 0.0 | 0.0 | 180 | 4 | 1.5 | 15 |
| None* | 0.02 | 0.0 | 253 | 4.1 | 4.5 | 19 |
| None* | 0.5 | 0.0 | 334 | 4.25 | 4.5 | 55 |
| None* | 0.75 | 0.0 | 317 | 4.5 | 4.5 | 54 |
| WWD1* | 0.02 | 0.1 | 50 | 4 | 1 | 4 |
| WWD1* | 0.1 | 0.1 | 48 | 4.1 | 4.5 | 4 |
| WWD1* | 0.25 | 0.1 | 183 | 4.1 | 5 | — |
| CR1421** | 0.1 | 0 | 96 | 4.2 | 4.5 | — |
| WWD1** | 0.1 | 0.1 | 74 | 4.2 | 4.5 | — |

*Foam formulation of Table 4
**Foam formulation of Table 8

EXAMPLE 7

TDI flexible molded polyurethane foams were prepared in this example using the formulation in Table 11.

TABLE 11

| Component | Parts by Weight |
| --- | --- |
| Arcol E 648 | 50.0 |
| Arcol E519 | 50.0 |
| DC5043 | 1.5 |
| DEOA-LF | 1.65 |
| Water (added) | 3.35 |
| DABCO 33 LV ® | 0.50 |
| DABCO ® BL-17 | 0.19 |
| Stabilizer/Cell Opener | Variable |
| TDI Index = 100 | |

Molded polyurethane foam samples were prepared using the following procedure. The polyols were mixed in a container, and the water, DEOA-LF, and amine catalysts were mixed in another container. The polyol mixture was incubated at 73° F. (23° C). The polyol was measured out into a ½ gallon (1.89 L) cup and the silicone surfactant was added. The charge factor was 2.65 which produced a 6% overpacked part in the mold. Using the Servodyne dispersator with a 3 in (7.6 cm) disc mixing blade, and controller set at 6000 rpm loaded, the cup of liquid was mixed 20 seconds. The water, DEOA-LF, and amine catalysts blend was then added. The cup of liquid was mixed 20 seconds, then the TDI was added and mixed for about 5 seconds. The mixture was poured into a 12×12×4 inch (30.5×30.5×10.2 cm), 155° F. (68° C.) mold, which was sprayed with a solvent based release agent PRC-798, and the cup was held inverted for 5 seconds, and the mold was immediately closed. For each foam, the following data was obtained and is presented in Table 12: extrusion time, string gel, extrusion weight, pad weight, and force to crush. Demold time was 275 seconds, with the FTC (force to crush) time being 330 seconds after mixing.

TABLE 12

| Additive | Use Level (pphpp) | Initial FTC | Bulk Stability | Surface Quality |
| --- | --- | --- | --- | --- |
| None | — | 207 | 4.5 | 5 |
| None | — | 240 | 4.5 | 4.8 |
| WWD1 | 0.01 | 154 | 1.1 | 4.5 |
| WWD1 | 0.02 | 119 | <1 | 4 |
| WWD1 | 0.03 | Foam Collapse | | |
| WWD4 | 0.1 | 253 | 4.5 | 4.8 |
| WWD4 | 0.5 | 219 | 4.5 | 4.5 |
| WWD4 | 1.0 | 226 | 4.25 | 4.5 |
| WWD4 | 3.0 | 170 | 4.25 | 4.5 |
| WWD4 | 3.0 | 163 | 4.25 | 4.8 |

Table 12 shows that WWD1 in a TDI formulation reduced force to crush but also provided a coarse cell structure as evidenced by the low value for bulk stability. For TDI formulations, wax dispersion WWD1, which melts too low compared to the exotherm temperature of the foam, caused a destabilization of the foam and poor cell structure. The approximate foam exotherm temperature of this TDI formulation was 134° C. whereas the water/wax dispersion melting point of WWD1 was 85° C., which is at the edge of the lower limit. The higher melting point wax dispersion WWD1, which had a wax particle melting point of 91° C., demonstrated a reduced force to crush with good cell structure in both the bulk and the surface.

EXAMPLE 8

TDI/MDI flexible molded polyurethane foams were prepared in this example using the procedure of Example 7 and the formulation of Table 11 except that a 50/50 mixture of TDI-80 and Mondur MRS-5 MDI was used.

TABLE 13

| Additive | Use Level (pphpp) | Initial FTC | Bulk Stability | Surface Quality |
| --- | --- | --- | --- | --- |
| None | — | 144 | 4.2 | 4.8 |
| None | 117 | 4.1 | 4.5 | |
| CP1421 | 1.0 | 92 | 4.25 | 5 |
| CP1421 | 1.0 | 91 | 4.2 | 4.5 |
| WWD1 | 0.03 | 70 | <1 | 1 |
| Epolene E20#6 | 0.5 | 124 | 4.25 | 4.8 |
| Epolene E20#6 | 1.0 | 136 | 4.25 | 4.8 |
| Duramul 766 | 0.5 | 119 | 4.25 | 4.8 |
| Duramul 766 | 1.0 | 130 | 4.5 | 4.8 |
| LX1130 | 0.5 | 99 | 4.5 | 4.8 |
| LX1130 | 1.0 | 81 | 4.2 | 4.5 |
| LX1061 | 1.0 | 103 | 4.25 | 4.8 |
| LX1061 | 1.6 | 71 | 4.2 | 4.8 |

The data in Table 13 shows the wax dispersion WWD1, whose particle melts too low compared to the exotherm temperature of the foam, caused a destabilization of the foam and poor cell structure. The approximate foam exotherm temperature of this TDI/MDI formulation is 125° C. whereas the water/wax dispersion particle melting point of WWD1 is 85° C. The higher melting Duramul 766 wax dispersion, which has a wax particle melting point of 126° C., was too high to be effective. The LX1130 and LX1061 water wax dispersions, having dispersion wax particle melting points of 90° and 92° C., respectively, demonstrated a reduced force to crush with good cell structure in both the bulk and the surface of the foam. This demonstrates that there is an optimum range of water/wax dispersion melting points that are effective for cell opening in polyurethane flexible molded foam.

EXAMPLE 9

This example shows the different foam exotherm temperatures for different foam formulations. The internal temperature of a foam made in a 1 gallon (3.78 L) free rise bucket was measured for an MDI, a TDI and an MDI/TDI formulation and the maximum temperatures are listed in Table 14. The exotherm temperatures in Table 14 are meant to approximate the exotherm temperature of a molded foam and being free rise temperatures may be different than the temperatures actually measured in a molded foam. The MDI formulation of Table 4, the TDI formulation of Table 11 and the MDI/TDI formulation of Example 8 were evaluated.

TABLE 14

| NCO System | Max Temp (°C.) | Time to max temp (Seconds) |
| --- | --- | --- |
| MDI | 91 | 179 |
| TDI | 134 | 205 |
| TDI/MDI | 125 | 250 |

EXAMPLE 10

This example shows the preparation of a foam automobile instrument panel using the formulation shown in Table 15 by the following procedure. Molded foam was made in a 12×12×2 inch (30.5×30.5×5.1 cm) heated mold; the mold temperature was kept at 115° F. (46° C.). Premix containing the materials for component B comprising the first seven components in Table 15 except catalyst and cell opener were prepared the day before making foam. A measured amount of the component B premix was poured into a half gallon (1.89 L) paper can, the appropriate amount of catalyst and cell opener were added to the premix and mixed for 12 seconds at 4500 rpm using a 2 inch (5.1 cm) in diameter mixing blade. A calculated amount of MDI to provide for a 100 index was added into the mixing cup, mixed for 7 seconds and the foaming mixture poured for 15 sec into the mold. The foam was demolded after 3.5 minutes. A charge factor of 3.6 was used to produce a 20% overpacked molded part.

TABLE 15

| Component | Parts by Weight |
| --- | --- |
| Arcol E 648 | 50.0 |
| Arcol E519 | 50.0 |
| DC2585 | 0.35 |
| TEOA | 0.75 |
| Water (added) | 2.2 |
| DABCO ® 33 LV | 0.35 |
| DABCO ® BL-11 | 0.25 |
| MDI Rubinate M Index = 100 | |

Parts were made using the above instrument panel formulation of Table 15 and severe shrinkage was observed upon demolding the part and cooling. The water/wax dispersion WWD1 was added to the above formulation at a use level of 0.15 parts wax dispersion per hundred wt parts polyol (0.0188 wt solids per 100 wt polyol) and very little or no shrinkage was observed upon demolding the part and cooling. The CP1421 cell opener was used up to 1.5 pphpp, but the part had shrinkage and splitting. The parts made with no cell opener or CP1421 were so poor that physical property measurements could not be made.

EXAMPLE 11

This example was an attempt to make a high water flexible slab foam in a 14×14×14 inch (35.6×35.6×35.6 cm) cardboard box. This foam collapsed. The formulation of Table 16 was used.

TABLE 16

| Component | Parts by Weight |
| --- | --- |
| Voranol 3010 | 100.0 |
| Silicone Surfactant | 1.0 |
| Water | 5.0 |
| Methylene Chloride | 7.0 |
| DABCO ® BLV | 0.2 |
| DABCO T-10 | 0.6 |
| TDI 80/20 Index = 102 | 58.15 |

WWD 1 was used in the above formulation at 0.10 parts.

The premix, (polyol, water and amine), was mixed in a container on a shaker for approximately one half hour and then allowed to stand still for at least 20 minutes before foams were made. The premix was incubated at 23° C. The lab temperature was approximately 23° C. The relative humidity of the hood was 60–65%. The premix was measured out into a ½ gallon cup and the silicone surfactant and Dabco T-10 catalyst were added. Using the Servodyne dispersator with a disc mixing blade, and controller—set at 4500 RPM, torque set at 25, and time set to 7 seconds, the cup of liquid was mixed for 25 seconds. The TDI/methylene chloride mixture was added and mixed for about. 5 seconds. The cup was lowered into a 35.6×35.6×35.6 cm box and poured, and held for 5 seconds and allowed to free rise. The foam collapsed.

Upon further experiments in other formulations, it was learned that the wax dispersion chosen for the above experiment, may have been the wrong choice since typical foam exotherms in flex slab foam can reach temperatures as high as 149° C. It is believed that if a higher melt wax was used for making the dispersion, a stable foam with good cell structure could have been obtained.

STATEMENT OF INDUSTRIAL APPLICATION

The invention affords a method for making water blown polyurethane flexible and semi-flexible foams with improved cell opening.

We claim:

1. In a method for preparing a flexible or semi-flexible polyurethane foam which comprises reacting an organic polyisocyanate with a polyol in the presence of a urethane catalyst, a blowing agent, optionally a silicone surfactant cell stabilizer, and a cell opening additive, the reaction generating foam exotherm, the improvement which comprises as the cell opening additive an aqueous dispersion of particles comprising a wax substance and optionally an emulsifier, at least 35% of the particles having a size of 0.2 to 5 microns and a melting point within a 55° C. range below the maximum foam exotherm temperature.

2. The method of claim 1 in which the particles are present at 0.0001 to 2 parts by wt solids per hundred parts of polyol (pphpp).

3. The method of claim 1 in which at least 25% of the particles have a size of 1.5 to 3 microns.

4. The method of claim 1 in which the aqueous dispersion is 5 to 60 wt % solids.

5. The method of claim 1 in which the blowing agent comprises water or water and an HCFC.

6. The method of claim 1 in which the organic polyisocyanate is MDI and the melting point of the dispersed particles is 0 to 30° C. below the maximum foam exotherm temperature.

7. The method of claim 1 in which the organic polyisocyanate is TDI and the melting point of the dispersed particles is 0 to 50° C. below the maximum foam exotherm temperature.

8. The method of claim 1 in which the organic polysisocyanate is a blend of MDI and TDI and the melting point of the dispersed particles is 0 to 40° C. below the maximum foam exotherm temperature.

9. The method of claim 1 in which at least 70% of the particles are within the stated size range of 0.2 to 5 microns.

10. The method of claim 1 in which the particles are present at 0.001 to 0.3 parts by wt solids per hundred parts of polyol (pphpp).

11. The method of claim 1 in which the wax substance is selected from the group consisting of paraffin waxes, microcrystalline waxes, synthetic waxes, vegetable waxes, mineral waxes, animal waxes, thickened petroleum fractions and polysiloxane release agents.

12. In a method for preparing a flexible polyurethane foam which comprises reacting an organic diisocyanate which is MDI, TDI, or a MDI/TDI mixture with a polyester or polyether polyol in the presence of urethane catalyst, water, liquid carbon dioxide, CFCs, HCFCs, HFCs, pentane, acetone and mixtures thereof as the blowing agent, optionally a silicone surfactant cell stabilizer, and a cell opening additive, the improvement which comprises as the cell opening additive present at 0.0001–2 pphpp an aqueous dispersion which is 5–60 wt % particles comprising a wax substance and an emulsifier, at least 35% of the particles having a size of 0.2 to 5 microns and a melting point within the range from 30° C. below the maximum foam exotherm temperature to the exotherm temperature of the MDI-based foam, from 50°C. below the maximum foam exotherm temperature to the exotherm temperature of the TDI-based foam or from 40° C. below the maximum foam exotherm temperature to the exotherm temperature of the MDI/TDI-based foam.

13. The method of claim 12 in which the cell opener is present at 0.001 to 0.3 pphpp.

14. The method of claim 13 in which at least 25% of the particles have a size of 1.5 to 3 microns.

15. The method of claim 14 in which the aqueous dispersion is 10 to 45 wt % solids.

16. The method of claim 13 in which the organic polyisocyanate is MDI and the melting point of the dispersed particles is 0 to 10° C. below the maximum foam exotherm temperature.

17. The method of claim 13 in which the organic polyisocyanate is TDI and the melting point of the dispersed particles is 0 to 45° C. below the maximum foam exotherm temperature.

18. The method of claim 13 in which the organic polyisocyanate is a blend of MDI and TDI and the melting point of the dispersed particles is 0 to 30° C. below the maximum foam exotherm temperature.

19. The method of claim 13 in which at least 70% of the particles are within the stated size range.

20. A flexible polyurethane foam having a density of 0.6–37.5 lb/ft$^3$ (10–600 kg/m$^3$) prepared by reacting a composition comprising the following components in parts by weight (pbw):

| | |
|---|---|
| Polyol | 20–100 |
| Polymer Polyol | 80–0 |
| Silicone Surfactant | 0.5–2.5 |
| Cell Opening Additive | 0.05–3 |
| Water | 1–8 |
| Auxiliary Blowing Agent | 0–4.5 |
| Crosslinker | 0.5–2 |
| Catalyst Composition | 0.1–5 |
| Isocyanate Index | 70–115 | the cell opening additive comprising an aqueous dispersion of particles comprising a wax substance and optionally an emulsifier, at least 35% of the particles having a size of 0.2 to 5 microns and a melting point which ranges from 0 to 55° C. below the maximum foam exotherm temperature.

* * * * *